United States Patent
Yamamoto et al.

(10) Patent No.: US 7,124,045 B2
(45) Date of Patent: Oct. 17, 2006

(54) DISPLACEMENT AMOUNT MEASURING DEVICE

(75) Inventors: Yuichi Yamamoto, Tochigi (JP); Yukio Shoji, Tochigi (JP); Nobumi Yoshida, Tochigi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/127,308

(22) Filed: May 12, 2005

(65) Prior Publication Data

US 2005/0273288 A1 Dec. 8, 2005

(30) Foreign Application Priority Data

May 14, 2004 (JP) .............................. 2004-145292

(51) Int. Cl.
G01F 1/12 (2006.01)
G01F 1/50 (2006.01)

(52) U.S. Cl. .................... 702/100; 702/94; 702/155

(58) Field of Classification Search ................ 702/86, 702/90, 94, 97, 116, 125, 126, 150, 114, 155, 702/158, 182, 185, 187, 100, 186; 324/207.2, 324/207.21, 207.11; 33/551–553, 533
See application file for complete search history.

(56) References Cited

U.S. PATENT DOCUMENTS

| | | | | |
|---|---|---|---|---|
| 4,914,609 A | * | 4/1990 | Shimizu et al. | ............. 702/158 |
| 5,467,289 A | * | 11/1995 | Abe et al. | .................... 702/167 |
| 5,485,082 A | * | 1/1996 | Wisspeintner et al. | ...... 324/202 |
| 6,151,791 A | * | 11/2000 | Shimazutsu et al. | .......... 33/552 |

FOREIGN PATENT DOCUMENTS

| JP | 58-193403 | 11/1983 |
|---|---|---|
| JP | 2000-258109 | 9/2000 |
| JP | 2002-273642 | 9/2002 |

* cited by examiner

*Primary Examiner*—Bryan Bui
(74) *Attorney, Agent, or Firm*—Westerman, Hattori, Daniels & Adrian, LLP.

(57) ABSTRACT

A disclosed device eliminates an error in a displacement amount measured value caused by changes over time in a characteristic of a displacement sensor, and can always maintain high accuracy of measurement. When a hydraulic valve, to which the displacement sensor is mounted, is positioned at predetermined positions, output signals from the displacement sensor are acquired as sample values. On the basis of the acquired sample values, a trend of changes over time in the characteristic of the displacement sensor is computed. Settings of a conversion table, which is used for displacement amount computation, are corrected in a direction along the computed trend of changes.

4 Claims, 4 Drawing Sheets

10 DISPLACEMENT SENSOR
12 SENSOR MAIN BODY
14 MOVABLE PLUG
16 MAIN BODY HOUSING
18 MAIN BODY CAP
20 PRESSURE-RESISTANT SLEEVE
22 CENTRAL AXIS
24 SHAFT
26 HOLDER
26a CYLINDRICAL INNER SPACE OF HOLDER
26b SIDE WALL OF HOLDER
26c OPENING OF HOLDER
26d STOPPER (CLAW) OF HOLDER
26e PRESSURE RELEASE HOLE OF HOLDER
30 MOVING SPACE
33 MAGNETIC FIELD
34A, 34B HALL IC

FIG. 1

10 DISPLACEMENT SENSOR
12 SENSOR MAIN BODY
14 MOVABLE PLUG
16 MAIN BODY HOUSING
18 MAIN BODY CAP
20 PRESSURE-RESISTANT SLEEVE
22 CENTRAL AXIS
24 SHAFT
26 HOLDER
26a CYLINDRICAL INNER SPACE OF HOLDER
26b SIDE WALL OF HOLDER
26c OPENING OF HOLDER
26d STOPPER (CLAW) OF HOLDER
26e PRESSURE RELEASE HOLE OF HOLDER
30 MOVING SPACE
33 MAGNETIC FIELD
34A, 34B HALL IC

DISPLACEMENT AMOUNT MEASURING DEVICE

BACKGROUND OF THE INVENTION

1. Field of the Invention

The present invention relates to a displacement amount measuring device which measures the displacement amount of a movable body by using a displacement sensor which outputs a sensor signal corresponding to the displacement amount of the movable body, and in particular, relates to a technique for calibrating the displacement amount measuring device in accordance with changes in the characteristic of the displacement sensor.

2. Description of the Related Art

Japanese Patent Application Laid-Open No. 2000-258109 discloses a displacement amount measuring device which measures the displacement amount of a movable element of a solenoid valve, by using a rod-shaped magnet which is interlocked with the movable element of the solenoid valve, and a magnetic sensing device (e.g., a Hall IC) which is held within a case assembled to the solenoid valve. Japanese Patent Application Laid-Open No. 2000-258109 also discloses that the neutral position is calibrated by learning control only one time after completion of assembly of the case and the solenoid valve, and that sufficient accuracy of measurement can be ensured merely by correcting the assembly error by this one-time calibration.

Japanese Patent Application Laid-Open No. S58-193403 discloses an angle detecting device in which, by using an angle sensor which is interlocked with rotation of a rotating body and emits a pulse signal each time the rotating body rotates by a unit angle and generates a reference pulse signal at a predetermined reference position, the angle value from the reference position is computed by counting the pulse signals inputted from the angle sensor, and the angle value is stored. This angle detecting device corrects the error of the angle value by resetting the stored angle value to zero when the reference pulse signal is inputted. However, if the angle value at the time when the reference pulse signal is inputted is outside of a range between a predetermined upper limit value and lower limit value, which can be considered to be reference positions, the angle value is not reset. In this way, erroneous resetting caused by high-frequency noise being mistakenly considered as the reference pulse signal, is prevented.

Japanese Patent Application Laid-Open No. 2002-273642 discloses the following in order to correct the feeding/driving of a ball screw of machine tool. Before machining, the ball screw is moved to the stroke end, and the coordinate value of the stroke end is detected. After machining, the ball screw is again moved to the stroke end, and the coordinate value of the stroke end is detected. On the basis of the difference in the coordinate values of the stroke end before machining and after machining (the amount of elongation of the main shaft due to the thermal expansion), the driving amount of the ball screw is corrected.

In the displacement amount measuring device disclosed in Japanese Patent Application Laid-Open No. 2000-258109, initial stage calibration of the neutral position of the movable body is carried out only one time at the time when the device is assembled, and no calibration whatsoever is carried out thereafter. However, the characteristic of the portion that first senses the displacement amount of the object, such as a magnet or a Hall IC or the like (a displacement sensor in the present specification), gradually changes over the long period of time of use of the displacement amount measuring device. For example, there are cases in which the magnetic force of the magnet gradually decreases or the position of the magnet shifts, or the circuit characteristics, such as the gain or the like, of the Hall IC also change. Due to such characteristics of the displacement sensor changing over time, the results of measurement of the displacement amount measuring device gradually include a large error.

In the angle measuring device disclosed in Japanese Patent Application Laid-Open No. S58-193403, the error in the angle measurement value, which is due to an error in counting the pulse signals, can be eliminated by resetting, to zero, the measurement value at the time when the rotating body is positioned at the reference position. However, the correction method, which is employed in Japanese Patent Application Laid-Open No. S58-193403 and in which the measurement value at the reference position is reset to zero, cannot eliminate errors in the measured value of the displacement amount, which errors are due to changes over time in the characteristic of the displacement sensor in a device which determines the displacement amount from a sensor signal value outputted from the Hall IC of a displacement sensor, such as the displacement amount measuring device disclosed in Japanese Patent Application Laid-Open No. 2000-258109. Namely, if the characteristic of the displacement sensor changes, because the non-linear relationship between the displacement amount and the sensor signal value changes over the entire displacement range, the errors in the results of measuring the displacement amount cannot be corrected over the entire displacement range, even if only the measured value of the one point which is the reference position is reset to zero.

In the ball screw feeding/driving device disclosed in Japanese Patent Application Laid-Open No. 2002-273642, the error in the ball feed amount, which is caused by thermal expansion of the main shaft during machining, can be corrected on the basis of the difference in the coordinate values of the stroke end before and after machining. However, in a device, such as the displacement amount measuring device disclosed in Japanese Patent Application Laid-Open No. 2000-258109, in which the non-linear relationship between the displacement amount and the sensor signal value changes over the entire displacement range due to changes in the characteristic of the displacement sensor, it is not possible to correct errors in the results of measurement of the displacement amount over the entire displacement range, merely from the difference in the coordinate values at the one point which is the stroke end.

SUMMARY OF THE INVENTION

Accordingly, an object of the present invention is to, in a displacement amount measuring device, eliminate the error in a displacement amount measured value which is caused by changes over time in the characteristic of a displacement sensor, and to be able to always maintain high accuracy of measurement.

The present invention provides a displacement amount measuring device for measuring a displacement amount of a movable body by using a displacement sensor outputting a sensor signal having a value corresponding to the displacement amount, the displacement amount measuring device comprising: a displacement amount computing component for computing the displacement amount of the movable body, by using a predetermined computational method and on the basis of the value of the sensor signal outputted from the displacement sensor; a timing component for detecting, as sampling points, points in time at which the movable body is positioned at each of a plurality of predetermined reference positions; a sampling component for acquiring, as sample values corresponding to the respective reference positions, values of the sensor signal which is outputted from the displacement sensor at the respective sampling points detected by the timing component; and a correcting component for, on the basis of the plurality of sample values which are acquired by the sampling component and which respectively correspond to the plurality of reference positions, computing a trend in changes over time of a characteristic of the displacement sensor, and correcting the computational method of the displacement amount computing component in accordance with the computed trend in changes. In accordance with this displacement amount measuring device, on the basis of sensor signal values at times when the movable body is positioned at plural reference positions respectively, the trend in the changes over time of the characteristic of the displacement sensor is grasped over a predetermined displacement range in which the plural reference positions exist. Because the method of computing the displacement amount is corrected on the basis thereof, high measurement accuracy can be maintained over the predetermined displacement range.

In a preferable aspect, the reference positions are set respectively at the both end points of the displacement range of the displacement sensor, i.e., at the maximum displacement point (top dead center) and the minimum displacement point (bottom dead center). In this way, correction over the entire displacement range is easy. Further, the accuracy of correction can be further improved by setting a reference position also at a neutral point between top dead center and bottom dead center.

In a preferable aspect, the timing component, the sampling component, and the correcting component operate in parallel with the displacement amount computing component, and the corrections of the computational method of the displacement amount computing component are carried out sequentially while the displacement amount computing component is computing the displacement amount. As a result, high measurement accuracy can always be maintained while the measurement operation continues. There is no need to interrupt the measurement operation which carries out correction.

In a preferable aspect, the timing component determines whether or not the movable body is positioned at the reference position, by monitoring a state value of a factor causing displacement of the movable body and determining whether or not the state value is steady for a predetermined time or more at a predetermined reference state value. In this way, because the times at which the movable body is certainly positioned at the reference positions can be grasped, the accuracy of correction improves.

In a preferable aspect, the displacement amount is computed by using a conversion table in which are set corresponding relationships between various sensor signal values and various displacement amounts. The correcting component determines differences between the sample values, which correspond to the plurality of reference positions, and the sensor signal values, which are set in the conversion table and which correspond to the plurality of reference positions, and corrects the various sensor signal values, which are set in the conversion table and which correspond to the various displacement amounts, in a direction of making the differences smaller. In this way, the conversion characteristic of the conversion table (the computational method) can be corrected over the entire displacement range, in accordance with the changes in the characteristic of the displacement sensor.

DESCRIPTION OF THE PREFERRED EMBODIMENTS

Figure 1:
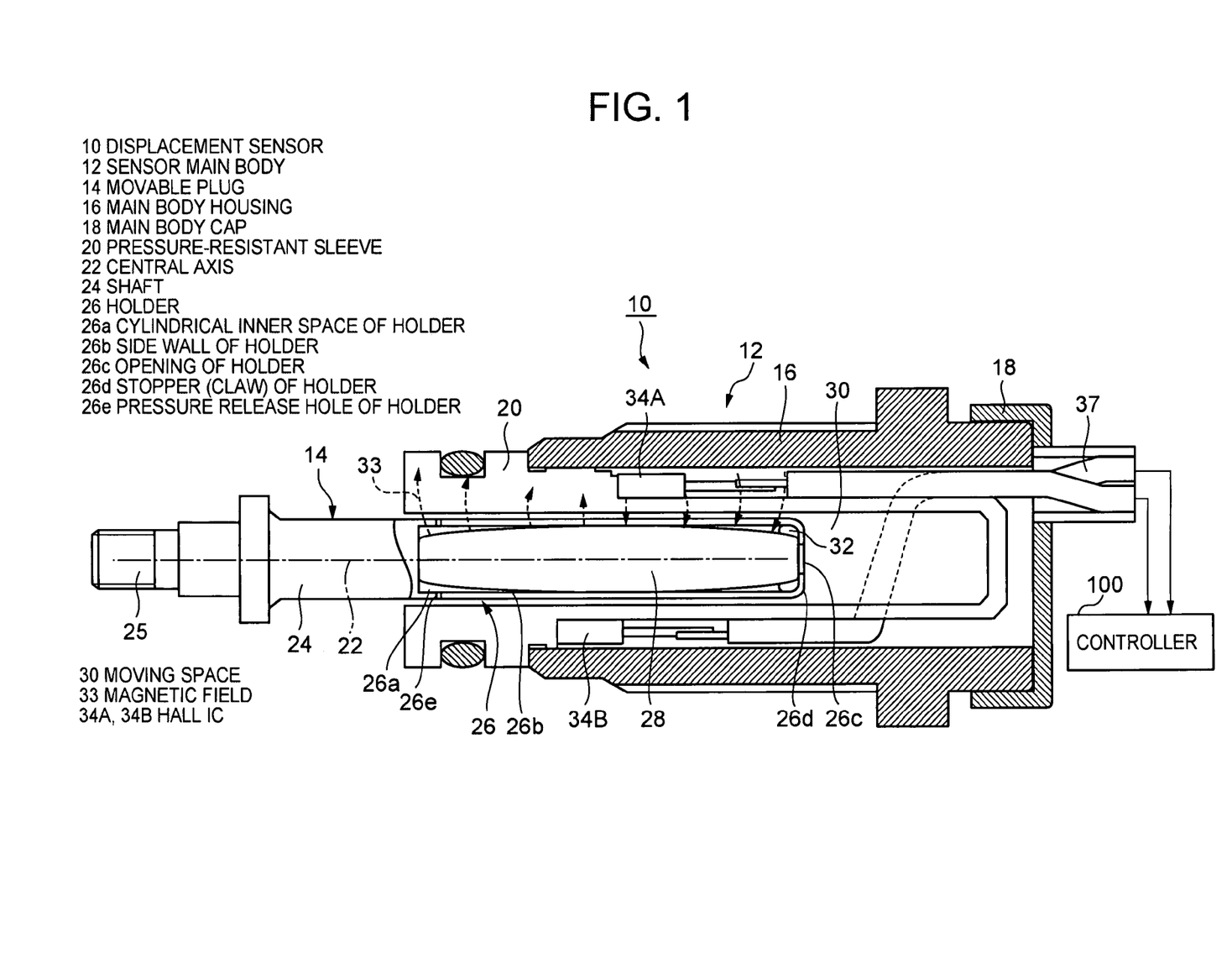
FIG. 1 is a cross-sectional view of an example of a displacement sensor which is applied to an embodiment of a displacement amount measuring device in accordance with the present invention.

FIG. 1 is a cross-sectional view of an example of a displacement sensor which is applied to an embodiment of a displacement amount measuring device in accordance with the present invention. In FIG. 1, the hatched portions are portions which are formed of magnetic materials. The white portions are, with the exception of a permanent magnet 28, portions which are formed of non-magnetic materials (e.g., non-magnetic stainless steel, plastic, rubber, and the like).

As shown in FIG. 1, a displacement sensor 10 has a sensor main body 12 and a movable plug 14. The sensor main body 12 has a main body housing 16 which is tubular and is open at the front and rear ends thereof. A main body cap 18 is placed on the rear end of the main body housing 16. Both the main body housing 16 and the main body cap 18 are formed of magnetic materials, and structure the outer shell of the sensor main body 12, and function to magnetically shield the interior of the sensor main body 12 from the exterior.

A pressure-resistant sleeve 20 is inserted into the main body housing 16 from the front end opening side thereof, and is fixed therein. One or plural (e.g., two in the present embodiment) magnetic sensing devices, e.g., Hall ICs 34A, 34B, are fixed to different positions of the outer side surface of the pressure-resistant sleeve 20. Sensor signals outputted from the Hall ICs 34A, 34B are taken-out to the exterior of the sensor main body 12 through signal cables 37, and are inputted to a controller 100 having the functions of the displacement amount measuring device in accordance with the present invention.

The pressure-resistant sleeve 20 has an opening at the front end thereof, and has, at the interior thereof, a moving space 30 for the movable plug 14. The moving space 30 is shaped as a long, thin cylinder which is enclosed by the wall of the pressure-sensitive sleeve 20. Typical applications of the displacement sensor 10 are, for example, the detecting of the displacement amount of a differential spool for detecting the oil flow rate of hydraulic equipment, the detecting of the stroke amount of the spool of a proportional control solenoid valve for moving a hydraulic actuator, and the like. In applications in hydraulic equipment, the moving space 30 within the pressure-resistant sleeve 20 is filled with high-pressure operating oil, and high-pressure oil pressure is applied to the wall of the pressure-resistant sleeve 20. The pressure-resistant sleeve 20 is formed of a durable non-magnetic material (e.g., non-magnetic stainless steel), and has strength sufficient to withstand the high-pressure oil pressure from the inner space 30.

The movable plug 14 is inserted in the moving space 30 from the opening at the front end of the pressure-resistant sleeve 20. The movable plug 14 is disposed at a position which is coaxial with the moving space 30. The movable plug 14 can move within a range of a given distance along a central axis 22 of the movable plug 14. The outer diameter of the portion of the movable plug 14, which portion is inserted within the pressure-resistant sleeve 20, is smaller than the inner diameter of the pressure-resistant sleeve 20, such that a slight clearance is ensured between the outer surface of the movable plug 14 and the inner surface of the pressure-resistant sleeve 20. The movable plug 14 can thereby move smoothly.

The main body of the movable plug 14 is a substantially cylindrical shaft 24 which is made of a non-magnetic material. A screw is formed at a front end portion 25 of the shaft 24, and, by this screw, the shaft 24 is joined to the movable body of an object of measurement (e.g., the aforementioned spool of a hydraulic valve, or the like). A rear-half portion 26 of the shaft 24, which portion 26 is inserted in the pressure-resistant sleeve 20, is a holder for fixing the permanent magnet 28. This holder 26 is shaped as a cylindrical tube, and has a sidewall 26*b* enclosing a cylindrical inner space 26*a*, and has an opening 26*c* at the rear end thereof. The round-bar-shaped permanent magnet 28 is accommodated in the inner space 26*a* of the holder 26. Plural claws 26*d* exist at the rear edge of the side wall 26*b* of the holder 26. These claws 26*d* bend inwardly so as to close the opening 26*c*, and abut the rear end surface of the permanent magnet 28, and fix the permanent magnet 28 such that the permanent magnet 28 does not move within a holder 24*b* in the direction of the central axis 22. The permanent magnet 28 is fixed within the holder 26 at a position coaxial to the holder 26, by a method which will be described later.

The permanent magnet 28 is molded in a shape in which the thickness (outer diameter) thereof differs depending on the place in the direction of the central axis 22. For example, in the present embodiment, the permanent magnet 28 is molded in an spindle-shaped configuration which is thickest at the central portion in the axial direction and tapers therefrom toward the both ends. This configuration of the permanent magnet 28 is selected in order to make the distribution of the strength of a magnetic field 33 formed by the permanent magnet 28 (in particular, the strength of the magnetic field components detected by the Hall ICs 34A, 34B) be a predetermined characteristic (e.g., a characteristic that is as close as possible to linear, but which is actually non-linear). Further, the inner space 26*a* of the holder 26 is a configuration and size which fit the thickest portion (the central portion in the present embodiment) of the permanent magnet 28. Accordingly, at the central portion of the permanent magnet 28 which is the thickest portion thereof, the permanent magnet 28 tightly contacts the side wall 26*b* of the holder 26. A circular-ring-shaped spacer 32 is fit on the narrow rear end portion of the permanent magnet 28. At the inner surface thereof, the spacer 32 is fit tightly to the permanent magnet 28, and at the outer surface thereof, the spacer 32 is fit tightly to the side wall 26*b* of the holder 26. Accordingly, the permanent magnet 28 is fixed such that the position of the axis thereof coincides with the central axis 22 of the holder 24*b*, at two places which are the central portion of the permanent magnet 28 which is the thickest portion thereof, and the rear end thereof where the spacer 32 is mounted. The stress applied to the permanent magnet 28 also can be mitigated by appropriately selecting the material of the spacer 32.

The inner space 26*a* of the holder 26 is divided into two regions which are the region further forward than the central portion of the permanent magnet 28, and the region further rearward than the central portion of the permanent magnet 28. A pressure release hole 26*e*, which communicates the forward region of the inner space 26*a* of the holder 26 and the outer space of the holder 26 (i.e., the moving space 30), is formed at one place or plural places of the side wall 26*b* of the holder 26. Pressure release grooves (not illustrated), which communicate the rearward region of the inner space 26*a* of the holder 26 and the outer space of the holder 26 (the moving space 30), are formed in the spacer 32. In the aforementioned application in hydraulic equipment, the outer space of the holder 26 (the moving space 30) is filled with high-pressure operating oil, and in the case of construction equipment or the like in particular, the oil pressure of the operating oil fluctuates greatly. Even in such cases, the pressure differential between the inner space 26*a* of the holder 26 and the outer space (the moving space 30) can be kept small due to the action of the pressure release holes 26*e* of the side wall 26*b* and pressure release grooves 32*c* of the spacer 32. Therefore, problems caused by this pressure differential becoming excessively large are prevented.

The sensor signals, which are outputted from the aforementioned two Hall ICs 34A, 34B of the displacement sensor 10, are always inputted to the controller 100. The controller 100 averages the values of these sensor signals, and on the basis of the averaged sensor signal value, computes in real time the displacement amount of the movable body (e.g., a proportional control solenoid valve for moving a hydraulic actuator), and carries out a predetermined control operation by using the computed displacement amount (e.g., operates the aforementioned proportional control solenoid valve, or the like). Here, over time, the strength of the magnetic field 33 of the permanent magnet 28 decreases, the axial position of the permanent magnet 28 becomes offset or tilts, and the gain which converts the magnetic field strengths of the Hall ICs 34A, 34B into electric signals varies, such that the sensing characteristic of the displacement sensor 10 varies. According to the principles of the present invention, the controller 100 grasps the trend of the changes over time in the sensing characteristic of the displacement sensor 10, and, in accordance with this trend of the changes, corrects the method of computing the displacement amount. High accuracy of measuring the displacement amount is thereby always maintained.

Figure 2:
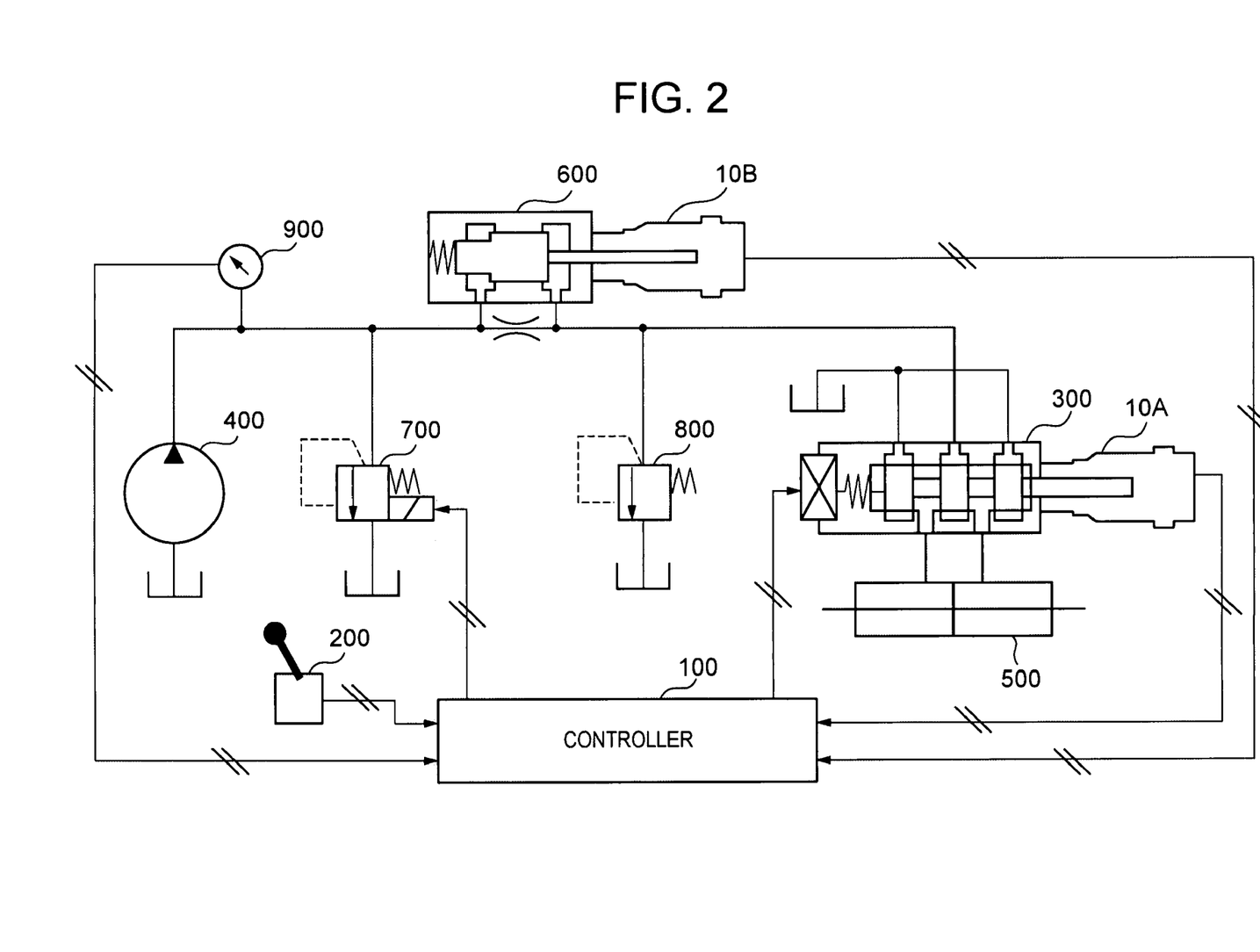
FIG. 2 is a circuit diagram showing an example of a simple hydraulic system to which a displacement sensor 10 and a controller 100 are applied.

FIG. 2 is a circuit diagram showing a model example of an extremely simple hydraulic system to which the displacement sensor 10 and the controller 100 are applied.

Two displacement sensors 10A, 10B having the structure shown in FIG. 1 are used in the example shown in FIG. 2. The first displacement sensor 10A is mounted to the proportional control solenoid valve 300, and is used in detecting the stroke amount of the spool of the proportional control solenoid valve 300. Here, the proportional control solenoid valve 300 is used for driving an actuator 500, by controlling the supply, to the actuator 500, of the oil pressure supplied from a hydraulic pump 400. The second displacement sensor 10B is mounted to a differential pressure sensor 600, and is used in detecting the stroke amount of the spool of the differential pressure sensor 600. Here, the differential pressure sensor 600 is used in order to detect the flow rate of the operating oil which is supplied from the hydraulic pump 400 to the actuator 500 or the like. Reference numeral 700 indicates a low-pressure relief valve for maintaining the oil pressure at the time of unloading of the hydraulic pump 400 (the unload pressure) at a predetermined value. Reference numeral 800 indicates a high-pressure relief valve for limiting the maximum oil pressure to a predetermined relief pressure. Reference numeral 900 indicates a pressure gage. The low-pressure relieve valve 700 is controlled by the controller 100 such that, at the time of unloading, the signal from the controller 100 is off and becomes a pressure which is set by a spring.

An operation instructing signal is inputted to the controller 100 from an operation inputting device (e.g., an operation lever) 200 which is operated by a person. In accordance with this operation instructing signal, the controller 100 operates the proportional control solenoid valve 300 and controls the movement of the actuator 500. At this time, a sensor signal is inputted from the first displacement sensor 10A to the controller 100. On the basis of the inputted sensor signal value, the controller 100 computes the stroke amount of the spool of the proportional control solenoid valve 300, and adjusts the operation amount for the proportional control solenoid valve 300 such that the computed stroke amount becomes the target stroke amount. In parallel with this operation of controlling the proportional control solenoid valve 300, the controller 100 learns, substantially in real time, the changes over time in the sensing characteristic of the first displacement sensor 10A, and, in accordance with the results of this learning, carries out control (hereinafter called "learning control") for correcting the computational method for computing the stroke amount (displacement amount) on the basis of the sensor signal value from the first displacement sensor 10A.

In this learning control, the controller 100 monitors the level of the operation instructing signal (e.g., a voltage signal) from the operation lever 200. This operation instructing signal is a factor causing displacement of the spool of the proportional control solenoid valve 300. Due to the controller 100 monitoring the operation instructing signal, the controller 100 detects, as sampling points, the points in time when the spool of the proportional control solenoid valve 300 is positioned at predetermined, plural reference positions, respectively. For example, three reference positions which are top dead center (maximum stroke position), neutral point (origin position), and bottom dead center (minimum stroke position), are set. Here, top dead center and bottom dead center are the both end points of the displacement range of the displacement sensor, and the neutral point is a middle point of the displacement range. Therefore, they are suitable for the learning control over the entire displacement range.

When the level of the operation instructing signal is steady for a given time (e.g., one second) or more at the maximum value, the controller 100 determines that the spool is positioned at top dead center. When the level of the operation instructing signal is steady for a given time (e.g., one second) or more at a neutral value, the controller 100 determines that the spool is positioned at the neutral position. When the level of the operation instructing signal is steady for a given time (e.g., one second) or more at the minimum value, the controller 100 determines that the spool is positioned at bottom dead center. The controller 100 stores, as sample values for learning control, the sensor signal values from the first displacement sensor 10A at the sampling points detected by such determinations. On the basis of the stored sample values, the controller 100 grasps the trend in the changes over time to the present, of the sensing characteristic of the first displacement sensor 10A. In accordance with the grasped trend in the changes over time, the controller 100 corrects the computational method (e.g., a conversion table in which the sensor signal values of the first displacement sensor 10A and stroke amounts (displacement amounts) correspond to one another) for computing the stroke amount (the displacement amount) from the sensor signal value of the first displacement sensor 10A.

A sensor signal is inputted from the second displacement sensor 10B to the controller 100. On the basis of the inputted sensor signal value, the controller 100 computes the stroke amount of the spool of the differential pressure sensor 600, and caries out various types of control (not shown) by using the computed stroke amount. In parallel with this control operation, the controller 100 learns, substantially in real time, the changes over time in the sensing characteristic of the second displacement sensor 10B, and, in accordance with the results of this learning, carries out learning control for correcting the computational method for computing the stroke amount (displacement amount) on the basis of the sensor signal value from the second displacement sensor 10B.

In this learning control, the controller 100 monitors, in addition to the aforementioned operation instructing signal, the pressure value detected by the pressure gage 900. This pressure value shows the state of the flow rate of the operating oil (the differential pressure at the throttle), which is a factor causing displacement of the spool of the differential pressure sensor 600. Due to the controller 100 monitoring the pressure value of the pressure gage 900 together with the operation instructing signal from the operation lever 200, the controller 100 detects, as sampling points, the points in time when the spool of the differential pressure sensor 600 is positioned at predetermined, plural reference positions, respectively. For example, two positions which are the position at the time of unloading (the time of zero flow rate, the time of zero differential pressure) and the position at the time of maximum pressure (the time of maximum flow rate, the time of maximum differential pressure) are set as the reference positions. Here, because the positions at the time of zero differential pressure and at the time of maximum differential pressure are the both end points of the usual displacement range of the differential pressure sensor 600 at the time of use, they are suitable for the learning control over the entire displacement range.

When the operation instructing signal from the operation lever 200 is steady for a given time (e.g., one second) or more at the neutral point and the pressure value from the pressure gage 900 is steady for a one second (e.g., one second) or more at the unload pressure of the low-pressure relief valve 700, the controller 100 determines that the spool is positioned at the position at the time of zero differential pressure. When the pressure value is steady for a given time (e.g., one second) or more at the relief pressure of the high-pressure relief valve 800, the controller 100 determines that the spool is positioned at the position at the time of a maximum differential pressure. The controller 100 stores, as sample values for learning control, the sensor signal values from the second displacement sensor 10B at the sampling points detected by such determinations. On the basis of these stored sample values, the controller 100 grasps the trend in the changes over time to the present, of the sensing characteristic of the second displacement sensor 10B. In accordance with the grasped trend in the changes over time, the controller 100 corrects the computational method (e.g., a conversion table in which the sensor signal values of the second displacement sensor 10B and stroke amounts (displacement amounts) correspond to one another) for computing the stroke amount (the displacement amount) from the sensor signal value of the second displacement sensor 10B.

Figure 3:
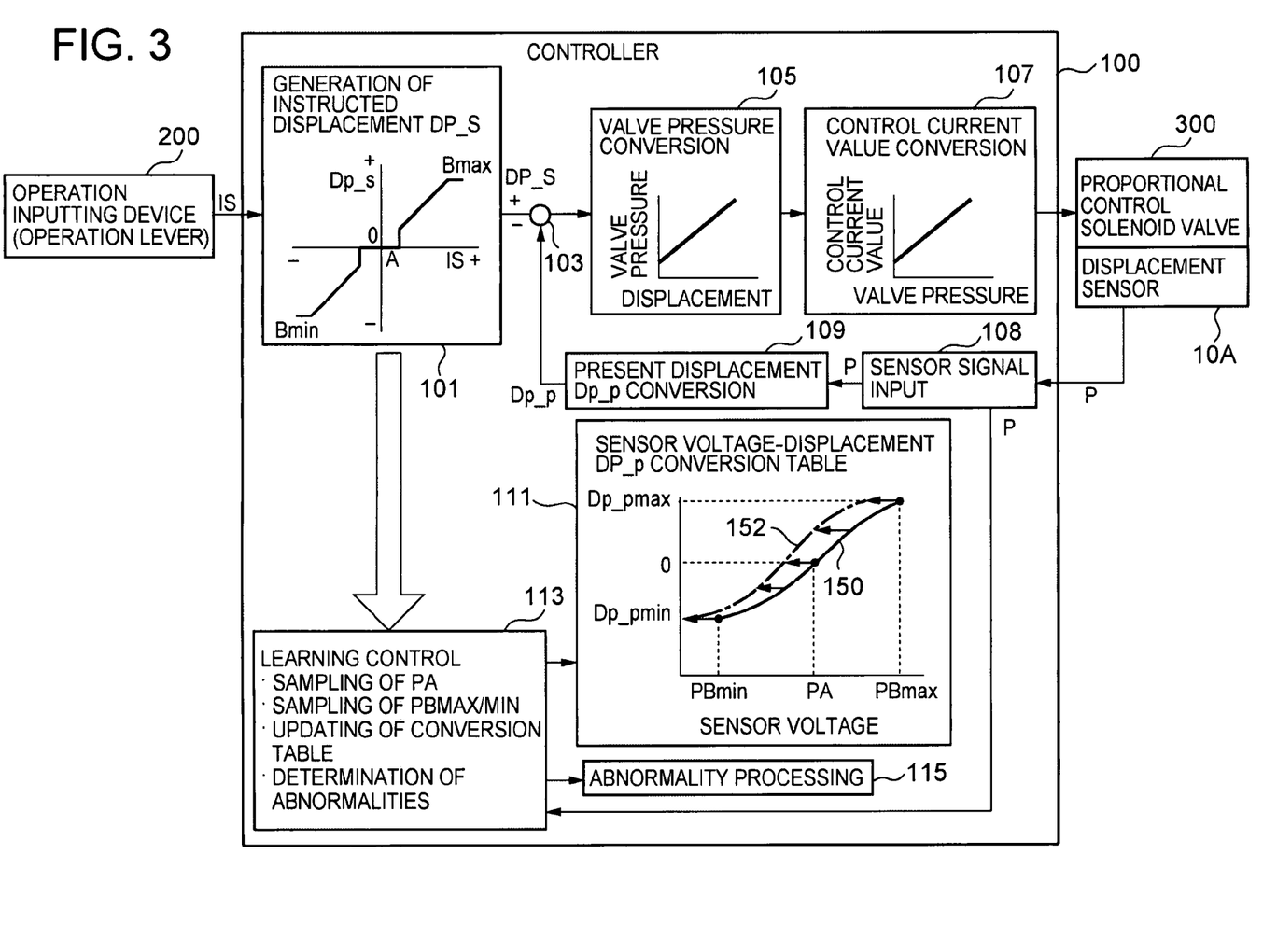
FIG. 3 is a block diagram showing the structure of the controller 100, and in particular, a structure for carrying out control for displacing a spool of a proportional control solenoid valve 300, and for carrying out learning control of changes over time of a first displacement sensor 10A, which is carried out in parallel with the aforementioned control.

FIG. 3 shows the structure of the controller 100, and in particular, a structure for carrying out control for displacing the spool of the proportional control solenoid valve 300, and for carrying out learning control of changes over time of the first displacement sensor 10A, which is carried out in parallel with the aforementioned control.

As shown in FIG. 3, the controller 100 is electrically connected to the operation inputting device (e.g., the operation lever) 200, the proportional control solenoid valve 300, and the displacement sensor 10A which is joined to the proportional control solenoid valve 300. The controller 100 has the function of feedback-controlling the stroke amount of the spool of the proportional control solenoid valve 300 (i.e., the oil pressure which the proportional control solenoid valve 300 sends to the actuator 500) in accordance with the operation of the operation inputting device 200 by an operator, and a learning control function of, in parallel with this feedback control operation, learning the present sensing characteristic of the displacement sensor 10A substantially in real time, and, in accordance with the results of learning, correcting the computational method which determines the displacement amount from the sensor signal value from the displacement sensor 10A.

First, the feedback control function will be described.

At processing 101, an operation instructing signal outputted from the operation inputting device 200 is inputted to the controller 100, and the controller 100 converts the inputted operation instructing signal IS into an instructed displacement Dp_s for the proportional control solenoid valve 300. Further, at processing 108, a sensor signal (a voltage signal in the case of a Hall IC, and called "sensor voltage signal" hereinafter) P outputted from the displacement sensor 1 is inputted to the controller 100. Then, in processing 109, on the basis of the sensor voltage signals P inputted at respective points in time, the controller 100 computes a present displacement amount (present stroke amount) Dp_p of the proportional control solenoid valve 300. A method in which the inputted sensor voltage signal P is converted to the present displacement amount Dp_p by referring to a sensor voltage—displacement conversion table 111, in which are set relationships of correspondence between various displacement amounts and various sensor voltage signal values based on the sensing characteristic of the displacement sensor 10A, is used as the computational method. Then, in processing 103, the controller 100 computes a deviation Dp_s–Dp_p between the instructed displacement Dp_s and the present displacement Dp_p. In subsequent processing 105, on the basis of this displacement deviation Dp_s–Dp_p, the controller 100 computes an operation amount of the oil pressure for the proportional control solenoid valve 300. In following processing 107, on the basis of this oil pressure operation amount, the controller 100 computes an operation amount of the control current for the proportional control solenoid valve 300, and on the basis of this control current operation amount, operates the control current which flows to the proportional control solenoid valve 300.

Figure 4:
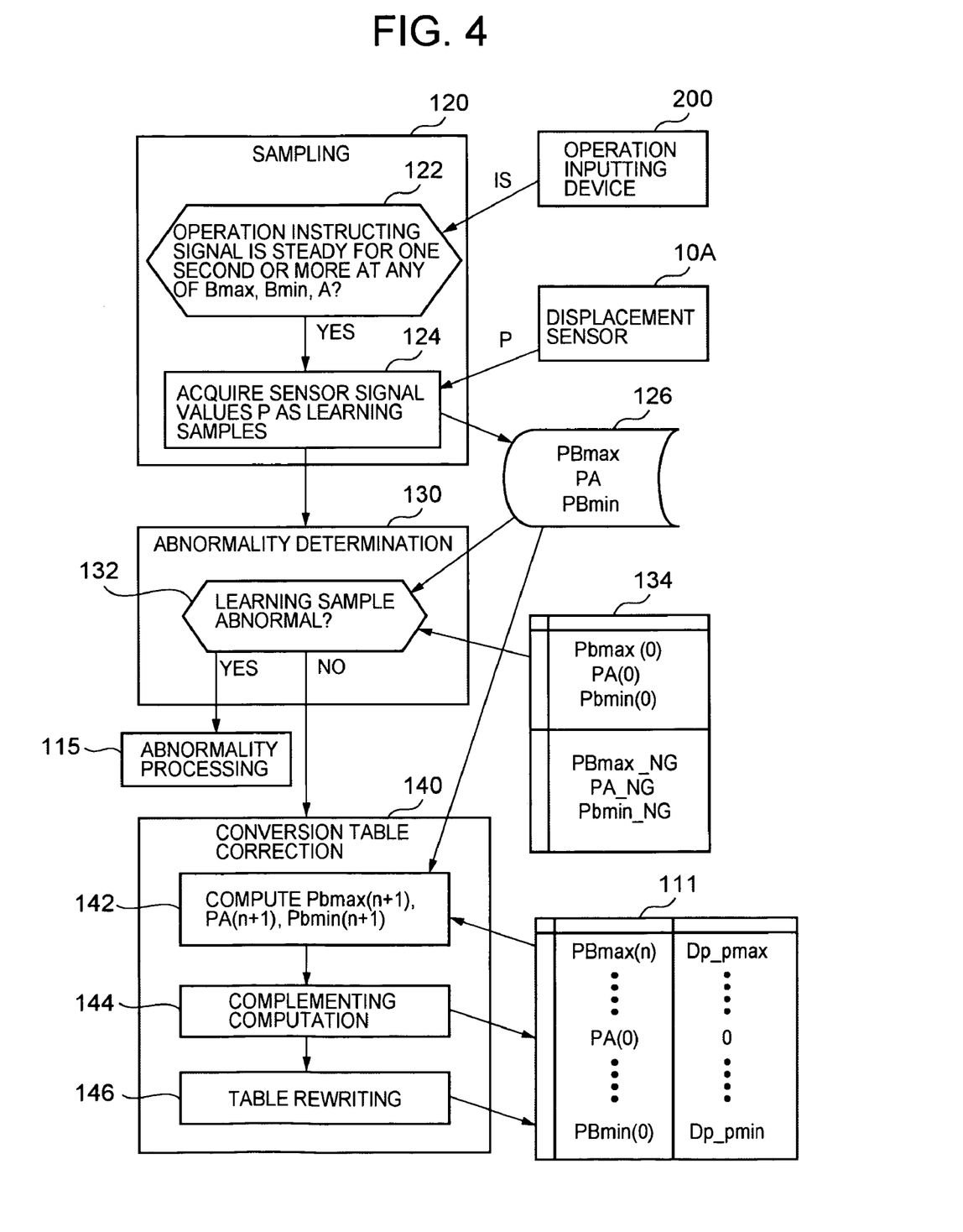
FIG. 4 is a flowchart showing the flow of processings of the learning control which the controller 100 carries out.

Next, the learning control function in accordance with processing 113 of FIG. 3 will be described. FIG. 4 shows the flow of this learning control. Hereinafter, the learning control processing will be described with reference to FIG. 3 and FIG. 4.

In the learning control 113, on the basis of the operation instructing signal IS from the operation inputting device 200, the controller 100 detects, as sampling points, the points in time at which it is certainly thought that the present displacement Dp_p of the proportional control solenoid valve 300 is positioned at the predetermined, plural reference positions, respectively. Here, the plural reference positions are, for example, top dead center (maximum displacement) Bmax, bottom dead center (minimum displacement) Bmin, and a neutral point (zero displacement) A, which are shown in the graph within processing 101 of FIG. 3. These can be called representative points which show the characteristic over the entire displacement range. When the instructing signal IS from the operation inputting device 200 respectively indicates the maximum displacement (top dead center) Bmax, the minimum displacement (bottom dead center) Bmin, and zero displacement (neutral point) A continuously for a given time (e.g., one second), the controller 100 detects these points in time as sampling points (step 122 of block 120 in FIG. 4). At these three sampling points, the displacement Dp_p of the spool of the proportional control solenoid valve 300 can be considered to be certainly positioned at top dead center Bmax, bottom dead center Bmin, and the neutral point A, respectively.

The controller 100 acquires, as respective sample values, the voltage signals P outputted from the displacement sensor 10A at the aforementioned, detected three sampling points, i.e., top dead center voltage signal value PBmax corresponding to top dead center Bmax, bottom dead center voltage signal value PBmin corresponding to bottom dead center Bmin, and neutral voltage signal value PA corresponding to the neutral point A (step 124 of the sampling processing 120 of FIG. 4). The acquired sample values are stored in a sample memory 126 shown in FIG. 4.

The controller 100 checks whether or not there is an abnormality at the acquired sample values (step 132 of abnormality determining processing 130 of FIG. 4). This abnormality determination is carried out as follows for example. The controller 100 has a set value memory 134 as shown in FIG. 4. Voltage signal values (hereinafter called "initial voltage signal values") PBmax(0), PBmin(0), and PA(0), which the displacement sensor 10A outputs respectively at top dead center Bmax, bottom dead center Bmin and the neutral point A at the initial stage, are stored in advance in the set value memory 134. These initial voltage signal values PBmax(0), PBmin(0), and PA(0) express the initially detected characteristic before actual use of the displacement sensor 10A, e.g., the set characteristic measured during inspection before shipping at the factory. The controller 100 computes the differences between the acquired sample values and the initially set values corresponding to these sample values. If the difference is larger than a predetermined threshold value, the controller 100 determines that that sample value is abnormal. Namely, the controller 100 determines whether or not the following conditions are established, given that the acquired sample values are PBmax, PBmin and PA, and the initial voltage signal values are PBmax(0), PBmin(0) and PA(0), and the threshold values are ΔPBmax_NG, ΔPBmin_NG and ΔPA_NG:

$$|PBmax-PBmax(0)|<\Delta PBmax\_NG \quad \text{formula 1}$$

$$|PBmin-PBmin(0)|<\Delta PBmin\_NG \quad \text{formula 2}$$

$$|PA-PA(0)|<\Delta PA\_NG \quad \text{formula 3.}$$

If any of the above conditions is established, it can be thought that there is some type of abnormality in the displacement sensor 10A, and therefore, the controller 100 carries out abnormality processing (step 115) such as warning the operator. If the above conditions are not established, it is considered that the acquired sample values are normal.

When the three, normal sample values PBmax, PBmin and PA, which correspond to top dead center Bmax, bottom dead center Bmin and the neutral point A, are acquired within a predetermined time difference range, the controller 100 determines the trend in the change of the characteristic of the displacement sensor 10A by using these three sample values PBmax, PBmin and PA. On the basis thereof, the controller 100 corrects the sensor voltage—displacement conversion table 111 (conversion table correction processing 140 in FIG. 4). This correction processing is carried out as follows for example.

Namely, given that the sample values which are used in the correction processing this time are PBmax, PBmin and PA, and the voltage signal values, which correspond to the reference positions (top dead center Bmax, bottom dead center Bmin, and the neutral point A) and which are currently set in the sensor voltage—displacement conversion table 111, are PBmax(n), PBmin(n) and PA(n), and the post-correction voltage signal values, which correspond to the reference positions and which will be newly set in the sensor voltage—displacement conversion table 111, are PBmax(n+1), PBmin(n+1) and PA(n+1), the controller 100 computes (step 142 in FIG. 4) the post-correction voltage signal values PBmax(n+1), PBmin(n+1) and PA(n+1) corresponding to the reference positions, by using the following formulas:

$$PBmax(n+1)=PBmax(n)+\alpha(PBmax-PBmax(n)) \quad \text{formula 4}$$

$$PBmin(n+1)=PBmin(n)+\alpha(PBmin-PBmin(n)) \quad \text{formula 5}$$

$$PA(n+1)=PA(n)+\alpha(PA-PA(n)) \quad \text{formula 6.}$$

Here, the (PBmax−PBmax(n)), (PBmin−PBmin(n)) and (PA−PA(n)) in the second terms at the right sides of the above three formulas show the trend in the changes over time of the sensing characteristic over the entire displacement range of the displacement sensor 10A. The factor $\alpha$ in these second terms is the correction gain for adjusting to what extent this trend in the changes over time of the sensing characteristic, is to be reflected in the correction of the sensor voltage—displacement conversion table 111, and is a positive value smaller than 1 (e.g., 0.1). Accordingly, the right sides of the above formulas mean that the voltage signal values PBmax(n), PBmin(n) and PA(n), which are set in the sensor voltage—displacement conversion table 111, are to be shifted in the direction along the trend in the changes over time of the sensing characteristic of the displacement sensor 10A.

Due to the controller 100 carrying out correction computation by using the post-correction voltage signal values PBmax(n+1), PBmin(n+1) and PA(n+1) which correspond to the reference positions and which are determined by the above formulas, the controller 100 also computes the post-correction voltage signal values which correspond to various displacement amounts, other than those of the reference positions, over the entire displacement range (step 144 in FIG. 4). Then, the controller 100 replaces (step 146 in FIG. 4) the voltage signal values PBmax(n), . . . , PA(n), . . . , PBmin(n), which correspond to various displacement amounts Dp_pmax, . . . , 0, . . . , Dp_pmin over the entire displacement range and which are presently set in the sensor voltage—displacement conversion table 111, with the post-correction voltage signal values PBmax(n+1), . . . , PA(n+1), . . . , PBmin(n+1) which are computed as described above. In this way, the voltage signal values, which are set in the sensor voltage—displacement conversion table 111, are corrected in the direction of making small the differences between the voltage signal values, which correspond to the reference positions and which are set in the sensor voltage—displacement conversion table 111, and the sample values which correspond to the reference positions (i.e., in the direction along the trend of the changes over time in the sensing characteristic of the displacement sensor 10A). Due to this correction, as shown as an example in the conversion table 111 of FIG. 3, a previous conversion characteristic 150 shown by the solid line is corrected over the entire displacement range in the direction of the changing trend of the sensing characteristic as shown by the arrows, and becomes new conversion characteristic 152 shown by the one-dot-chain line.

The above-described conversion table 111 correction operations are carried out at all times during the time the displacement sensor 10A is used. In this way, the contents of the conversion table 111 are made to suit the present sensing characteristic of the displacement sensor 10A, substantially in real time. Accordingly, even if there are changes over time in the sensing characteristic of the displacement sensor 10A, accurate displacement amount measuring results are always obtained. Further, on the basis of the trend in the changes over time of the sensing characteristic of the displacement sensor 10A which is grasped as described above, it is possible to carry out not only correction of the displacement amount computing method, but also prediction of future occurrences of abnormalities at the displacement sensor 10A, and the like.

An embodiment of the present invention has been described above, but this embodiment is merely an example for explaining the present invention, and does not mean that the scope of the present invention is limited only to this embodiment. The present invention can be embodied in other, various forms without deviating from the gist of the present invention.

For example, in above formulas 4, 5 and 6, instead of the second terms $\alpha(PBmax-PBmax(n))$, $\alpha(PBmin-PBmin(n))$ and $\alpha(PA-PA(n))$ at the right side, it is possible to use correction step values of uniform widths having the same polarities as the characteristic changing trend (PBmax−PBmax(n)), (PBmin−PBmin(n)) and (PA−PA(n)).

What is claimed is:

1. A displacement amount measuring device, which measures a displacement amount of a movable body by using a displacement sensor outputting a sensor signal having a value corresponding to the displacement amount of the movable body, the device comprising:
  a displacement amount computing component for computing the displacement amount of the movable body by using a predetermined computational method and on the basis of the value of the sensor signal outputted from the displacement sensor;
  a timing component for detecting sampling points, said sampling points being points in time at which the movable body is positioned at each of a plurality of predetermined reference positions;
  a sampling component for acquiring sample values corresponding to the respective reference positions, said sample values being values of the sensor signal, which are outputted from the displacement sensor at the respective sampling points detected by the timing component; and
  a correcting component for, on the basis of the plurality of sample values that are acquired by the sampling component and respectively correspond to the plurality of reference positions, computing a trend in changes over time of a characteristic of the displacement sensor, and for correcting the computational method of the displacement amount computing component in accordance with the computed trend in changes.

2. The displacement amount measuring device according to claim 1, wherein the timing component, the sampling component, and the correcting component operate in parallel with the displacement amount computing component, so that sequential corrections of the computational method of the displacement amount computing component are carried out while the displacement amount computing component computes the displacement amount.

3. The displacement amount measuring device according to claim 1, wherein the timing component determines whether or not the movable body is positioned at the reference position by monitoring a state value of a factor causing displacement of the movable body and determining whether or not the state value is steady for a predetermined time or more at a predetermined reference state value.

4. The displacement amount measuring device according to claim 1, wherein the computational method utilizes a conversion table in which corresponding relationships between various sensor signal values and various displacement amounts are set, and the correcting component determines differences between the sample values, which correspond to the plurality of reference positions, and the sensor signal values, which are set in the conversion table and which correspond to the plurality of reference positions, and corrects the various sensor signal values, which are set in the conversion table and which correspond to the various displacement amounts, in a direction of making the differences smaller.

* * * * *